United States Patent [19]

Edye et al.

[11] Patent Number: 5,653,302
[45] Date of Patent: Aug. 5, 1997

[54] HYBRID VEHICLE

[75] Inventors: Thomas Edye, Boudry; René Jeanneret, Merzligen, both of Switzerland

[73] Assignee: SMH Management Services AG, Switzerland

[21] Appl. No.: 423,090

[22] Filed: Apr. 18, 1995

[30] Foreign Application Priority Data

Apr. 19, 1994 [CH] Switzerland .................. 01 180/94

[51] Int. Cl.$^6$ ..................................................... B60K 1/00
[52] U.S. Cl. ....................................................... 180/65.2
[58] Field of Search ............................... 180/65.2, 65.3, 180/65.4, 65.5, 65.8; 318/139; 290/40 A

[56] References Cited

U.S. PATENT DOCUMENTS

| 3,716,767 | 2/1973 | Kuriyama et al. ............... 318/139 |
| 3,981,287 | 9/1976 | Williams et al. ................ 290/40 A |
| 5,214,358 | 5/1993 | Marshall ......................... 180/65.4 |
| 5,402,046 | 3/1995 | Jeanneret ........................ 180/65.4 |
| 5,515,937 | 5/1996 | Adler et al. ..................... 180/65.4 |

FOREIGN PATENT DOCUMENTS

| 0093930 | 11/1983 | European Pat. Off. ........... 290/40 A |
| 0556942 | 8/1993 | European Pat. Off. . |
| 4133059 | 4/1993 | Germany . |
| WO93/07021 | 4/1993 | WIPO . |

*Primary Examiner*—Brian L. Johnson
*Assistant Examiner*—Frank Vanaman
*Attorney, Agent, or Firm*—Law Offices Pollock, Vande Sande & Priddy

[57] ABSTRACT

The vehicle comprises an electric drive motor, a generator driven by a gasoline engine and a regulating circuit which regulates the speed of rotation of the gasoline engine and the electric power supplied to the electric motor as a function of the position of an accelerator pedal and which is arranged so that this electric power increases at the same time as the speed of rotation of the gasoline engine when the pedal is actuated to increase the speed of the vehicle. This feature removes the delay which, in known vehicles of the same type, separates the actuation of the accelerator pedal from the increase in the electric power supplied to the drive motor.

5 Claims, 6 Drawing Sheets

HYBRID VEHICLE

BACKGROUND OF THE INVENTION

The instant invention concerns a motor vehicle comprising:

a first engine constituted by an internal combustion engine for producing a mechanical power, speed slaving means comprising first measurement means coupled to said first engine for providing a first measurement signal representative of the rotation speed of said first engine and responding to a desired speed signal representative of a desired rotation speed for slaving said rotation speed of said first engine to said desired rotation speed, a control device comprising a control member able to be actuated by a driver of said vehicle and a detector coupled to said control member for providing a first desired power signal representative of the position of said control member and of a first desired power;

a generator mechanically coupled to said first engine for producing a first electric power in response to said mechanical power;

a drive wheel;

a second engine constituted by an electric motor mechanically coupled to said drive wheel, and regulating means responding to said first electric power for supplying a second electric power to said second engine and responding to said first desired power signal for producing said desired speed signal and for slaving said second electric power to said first desired power.

A vehicle having the above characteristics, which is often termed a hybrid vehicle, is disclosed in the PCT patent application published under number WO 93/07021.

When a vehicle of this type is used, its internal combustion engine is permanently in operation. The generator driven by this engine thus also permanently provides all the energy consumed by the electric motor which is coupled to the drive wheel of the vehicle, and which will be called a drive motor in the following description.

This feature gives this vehicle the advantage of not having to include a large capacity accumulator battery such as that which, in other known vehicles of the same type, provides at least partially and/or temporarily the electric energy consumed by the drive motor.

The vehicle disclosed in patent application WO 93/07021 mentioned above, comprises a control circuit which slaves the electric power supplied to the drive motor to a variable desired power determined by the position of an accelerator pedal.

When the driver of the vehicle modifies the position of the accelerator pedal to increase the power supplied to the drive motor, for the purpose, for example, of increasing the speed of this vehicle, the regulating circuit determines a new desired power corresponding to the new position of the accelerator pedal and a new desired rotation speed which is that at which the internal combustion engine of the vehicle must rotate to provide a mechanical power equal, except for the losses, to the above-mentioned desired power while only consuming the smallest possible amount of fuel.

Initially, the regulating circuit does not however modify the electric power supplied by the generator to the drive motor, but only acts upon the internal combustion engine so that the mechanical power provided by the latter increases. Since this mechanical power is now greater than the electric power provided by the generator, the rotation speed of the internal combustion engine increases.

At the moment when this internal combustion engine rotation speed reaches its new desired value, and only at this moment, the regulating circuit increases the electric power supplied to the drive motor to its new desired value. As this electric power is now equal, again except for the losses, to the mechanical power provided by the internal combustion engine, the rotation speed of the latter stabilises at the new desired speed.

It can be seen that in such a case, the electric power supplied to the drive motor does not immediately increase when the driver of the vehicle moves the accelerator pedal to its new position, but only after a certain period of time which may amount to several seconds, which is very unpleasant for the driver of the vehicle and may even be dangerous.

A known vehicle such as the one which has been described above also has the disadvantage that, when its driver rapidly changes the position of its accelerator pedal by a significant amount when it is at rest or moving slowly, the regulating circuit supplies to the drive motor all the electric power corresponding to the new position of the accelerator pedal as soon as the internal combustion engine has reached its new desired speed, as has been described above.

At this moment, the drive motor is still at rest or is rotating only slowly. The current which it absorbs can thus be very high and have an intensity several times greater than that of the current absorbed by this drive motor when it rotates at its maximum speed while providing its maximum mechanical power.

The various electronic components of the regulating circuit which are traversed by the current absorbed by the drive motor must therefore be so dimensioned that they are capable of withstanding this very high current without damage, even if the circumstances in which this very high current passes in these components occur only relatively rarely. These components are thus costly, and their price unfavourably affects that of the regulating circuit.

SUMMARY OF THE INVENTION

One aim of the instant invention is to offer a vehicle of the same type as that which has been described above but which does not have the disadvantages of the latter, that is to say, a vehicle in which the electric power supplied to the drive motor immediately increases when its driver presses on its accelerator pedal and in which the current absorbed by the drive motor never exceeds the value which it has when this drive motor rotates at its maximum speed while providing its maximum power.

This aim is achieved by the claimed vehicle, which comprises a first engine constituted by an internal combustion engine for producing a mechanical power, speed slaving means comprising first measurement means coupled to said first engine for providing a first measurement signal representative of the rotation speed of said first engine and responding to a desired speed signal representative of a desired rotation speed for slaving said rotation speed of said first engine to said desired rotation speed;

a control device comprising a control member able to be actuated by a driver of said vehicle and a detector coupled to said control member for providing a first desired power signal representative of the position of said control member and of a first desired power;

a generator mechanically coupled to said first engine for producing a first electric power in response to said mechanical power;

a drive wheel;

a second engine constituted by an electric motor mechanically coupled to said drive wheel; and regulating means responding to said first electric power for supplying a second electric power to said second engine and responding to said first desired power signal for producing said desired speed signal and for slaving said second electric power to said first desired power, and which is characterised in that said vehicle further comprises second measurement means coupled to said second engine for providing a second measurement signal representative of the rotation speed of said second engine;

and in that said regulating means comprise:

power slaving means responding to a second desired power signal representative of a second desired power for slaving said second electric power to said second desired power;

safety means responding to said first desired power signal and to said second measurement signal for providing a third desired power signal representative of a third desired power and arranged so that said third desired power signal has a value such that said third desired power is at most equal to the maximum electric power that said slaving means can provide without being damaged to said second engine;

first signal processing means responding to said third desired power signal for providing said desired speed signal and arranged so that said desired speed signal has a value such that, when the rotation speed of said first engine is equal to said desired speed, a determined fraction of the maximum mechanical power which said first engine can provide is equal to the sum of said third desired power and the powers dissipated in said generator and in said power control means;

second signal processing means responding to said first measurement signal for providing a fourth desired power signal representative of a fourth desired power and arranged so that said fourth desired power signal has a value such that said fourth desired power is equal to the difference between said determined fraction of said maximum mechanical power and said dissipated powers; and selection means responding to said third desired power signal and to said fourth desired power signal for providing said second desired power signal and arranged so that said second desired power signal has a value such that said second desired power is equal to the smallest of said third desired power and said fourth desired power.

As a result of these features, and as will be shown in more detail below, a vehicle according to the instant invention reacts exactly like a conventional vehicle when its driver presses on the accelerator pedal, the electric power supplied to the drive motor increasing at the same time as the mechanical power supplied by the internal combustion engine, without the necessity of waiting for this internal combustion engine to have reached its new rotation speed as in the known vehicle disclosed in patent application WO 93/07021.

Consequently it is much more pleasant and safe to drive a vehicle according to the instant invention than the known vehicle mentioned above.

Moreover, and still as a result of these features, the electronic components traversed by the current absorbed by the drive motor do not need to be so dimensioned that they are capable of withstanding without damage a greater current than that which this motor absorbs when it supplies its maximum power while rotating at its maximum rotation speed.

Consequently, these electronic components may be less expensive, all other things being equal, than the corresponding electronic components of the aforementioned known vehicle and the cost price of the vehicle according to the instant invention may thus be lower, all other things again being equal, than that of this known vehicle.

BRIEF DESCRIPTION OF THE DRAWINGS

Other aims and advantages of the instant invention will become clear from the following description, made with the aid of the attached drawing in which.

DETAILED DESCRIPTION OF THE INVENTION

Before commencing the description of the invention, it will be noted that the electrical connections between the different components of the block diagram of FIG. 1 which will be described below have been represented by simple lines provided with arrows which indicate in schematic form the direction in which the data or the electric energy are transmitted from one component to another. The man skilled in the art will, however, easily recognize that certain of these connections are formed, in practice, by several conductors which have not been shown separately in order to avoid complicating FIG. 1 unnecessarily.

Moreover, the man skilled in the art will easily see that the majority of the circuits which process and/or produce this data, and which will be described below, are advantageously circuits of the numerical type, the signals which transmit this data from one of these circuits to another being thus evidently also of the numerical type.

Likewise, the man skilled in the art will recognize that all these numerical circuits may advantageously be replaced by a computer programmed to fulfil the same functions as these circuits.

Figure 1:
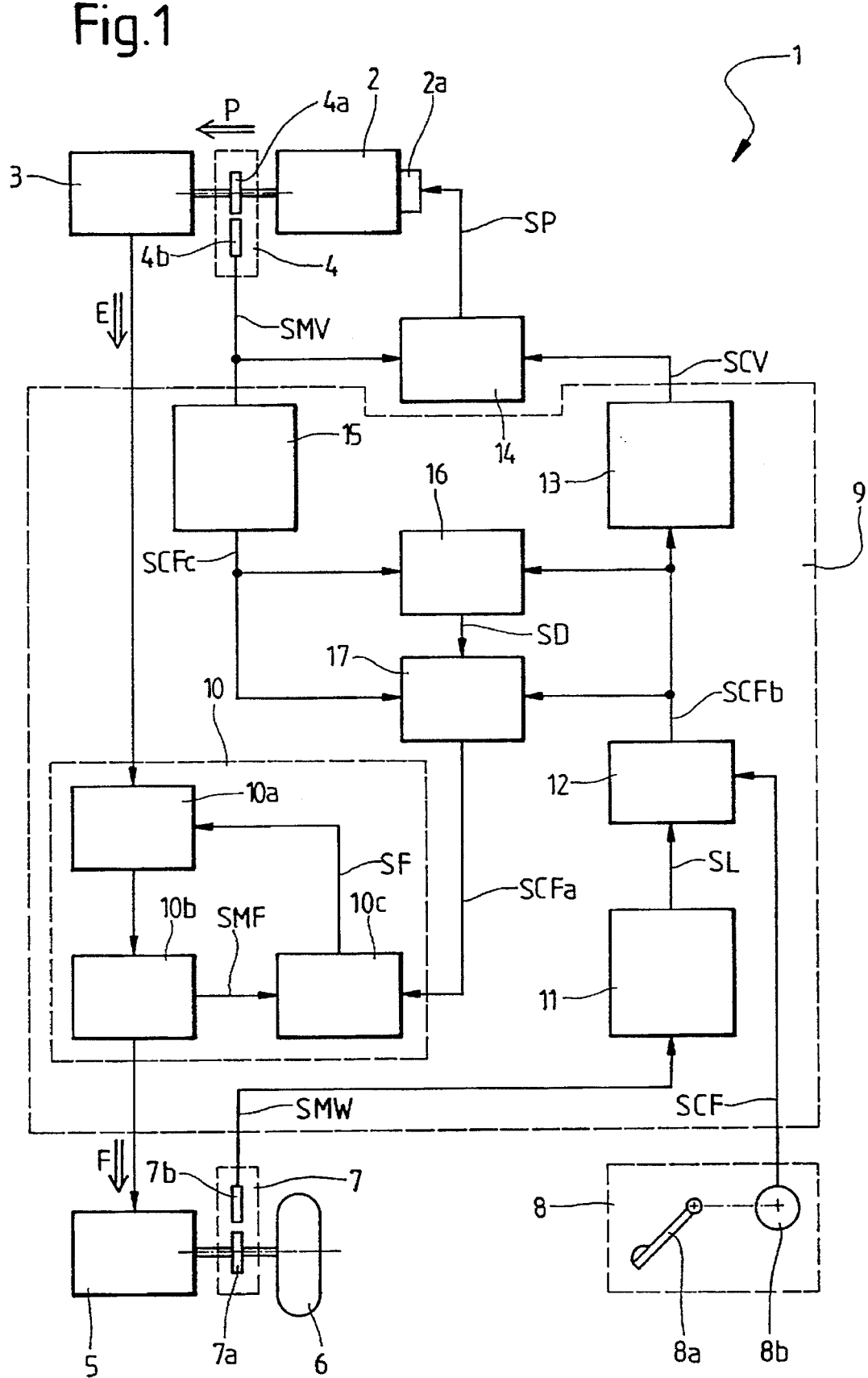
FIG. 1 is a block diagram of an embodiment of the vehicle according to the instant invention.

It will also be noted that the double arrows visible in FIG. 1 represent the different mechanical or electric powers which are set into play in the vehicle of this FIG. 1.

In its embodiment shown schematically and partially in FIG. 1 by way of non-limiting example, the vehicle according to the instant invention is designated by the general reference 1.

Vehicle 1 comprises an internal combustion engine 2 whose fuel and combustive supply element is designated by the reference 2a.

In order to simplify the instant description, it will be admitted that engine 2 is, in the present example, a conventional gasoline engine and that its supply element 2a is formed by an equally conventional carburettor.

The man skilled in the art will however easily see that engine 2 may be of any one of the well known different types of internal combustion engines such as, for example, Diesel engines or gas turbine engines. Likewise, element 2a may be of any one of the different types of supply elements suited respectively to these different types of internal combustion engines. In particular, when engine 2 is a gasoline engine as in the present example, its supply element 2a may of course be formed by an equally well known injection system.

However, for a reason which will be made clear from the following description, the flow of fuel and/or combustive supplied to engine 2 must be able to be regulated in response to an appropriate control signal which will be designated by the reference SP.

It will be admitted in the present example that carburettor 2a of gasoline engine 2 is arranged so that its throttle valve, which is not shown separately, passes from its completely closed position to its completely open position when this control signal SP varies from a minimum value SPmin to a maximum value SPmax.

Signal SP thus constitutes a control signal of mechanical power P supplied by engine 2, this power P evidently being equal to its maximum value Pmax when signal SP has its maximum value SPmax.

Figure 2:
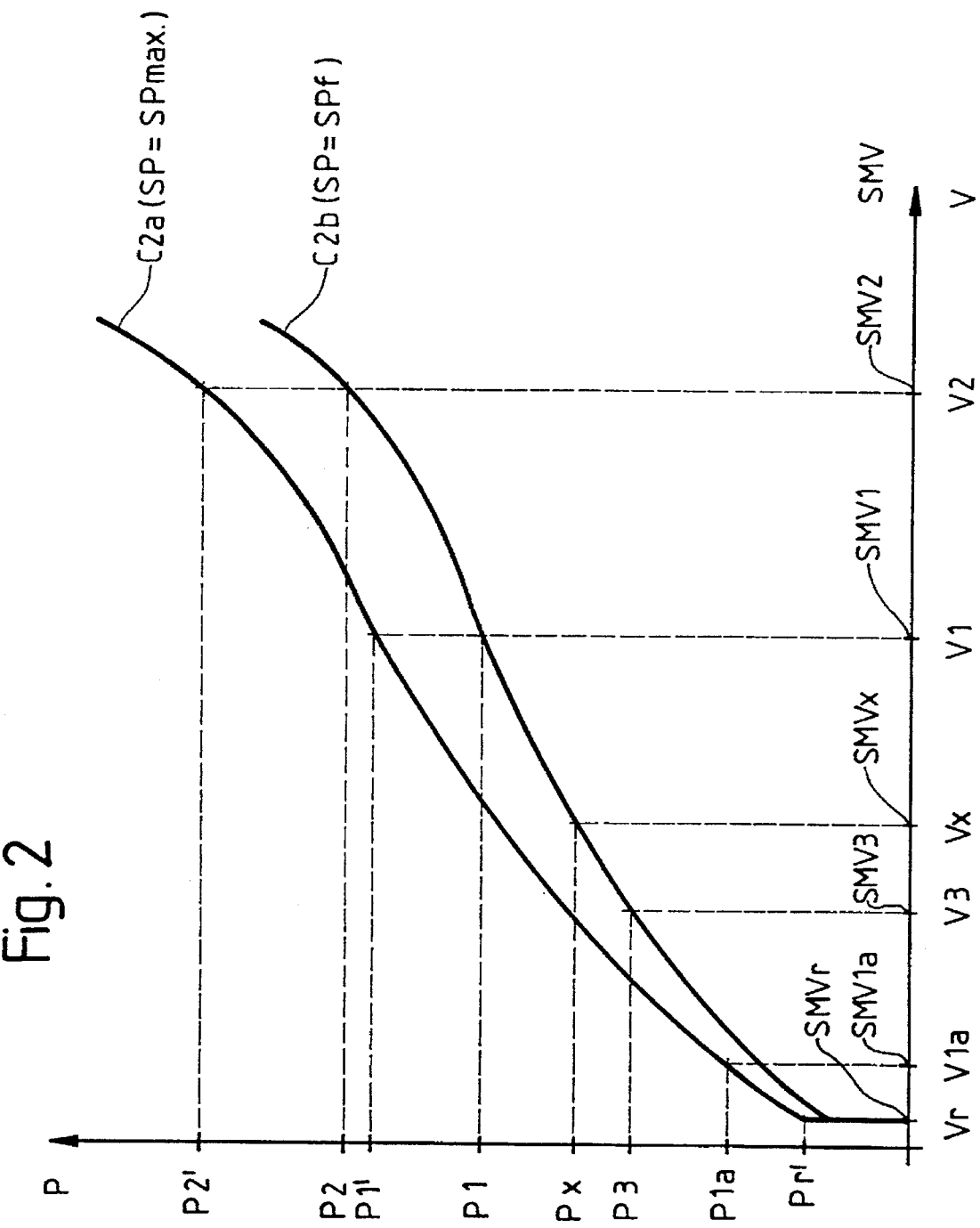
FIG. 2 is a diagram schematically representing the variation of mechanical power P supplied by a gasoline engine as a function of its rotation speed V for two different values of its carburettor control signal SP.

Curve C2a of FIG. 2 shows schematically the well known variation of this maximum power Pmax as a function of rotation speed V of engine 2.

In the description which follows and for a reason which will be made clear below, one will designate as SPf the value of signal SP for which engine 2 supplies a mechanical power Pf equal to a determined fraction f of its maximum power Pmax, whatever its rotation speed V.

For a reason that will be made evident later, that fraction f must be less than 100%. But a person skilled in the art will understand that this fraction f must not be too small, for the motor 2 would then function most of the time with an efficiency clearly smaller than its maximum efficiency. Practically, the value of this fraction f will be chosen between 90% and 70%, for example about 80%.

Curve C2b also drawn in FIG. 2 shows schematically the variation of this mechanical power Pf as a function of rotation speed V of engine 2 in the case where fraction f mentioned above is equal to 80%.

It will be noted that, in a manner which is well known, mechanical power P supplied by engine 2 is zero, or at least practically zero, when signal SP has its minimum value SPmin, the curve representing this mechanical power P being thus practically identical to the x axis of FIG. 2.

It will also be noted that, also in a well known manner, mechanical power P supplied by engine 2 is also zero, or practically zero, when rotation speed V of this engine 2 is equal to or less than its so-called idling speed, which is designated by the reference Vr in FIG. 2.

The output shaft of engine 2 is connected to the rotor, which is not separately shown, of a rotary electric energy generator 3 by a mechanical connection represented in FIG. 1 by a double line.

The electric power supplied by generator 3 in response to mechanical power P which it receives from engine 2 will be designated by the reference E. The difference between this mechanical power P and this electric power F, which represents the power dissipated in generator 3, will be designated by the reference DG.

In FIG. 1, engine 2 and generator 3 are separate from each other, but it is evident that they may also be mounted close to each other. Likewise, the mechanical connection between the output shaft of engine 2 and the rotor of generator 3 may be direct, as has been shown, or be achieved by way of a gear train or any other similar device.

Vehicle 1 comprises a measuring device 4 supplying a measurement signal SMV proportional to rotation speed V of gasoline engine 2, which is also evidently, in the present example, the rotation speed of generator 3. FIG. 2 thus also shows the variation of mechanical powers Pmax and Pf as a function of the value of signal SMV.

Measuring device 4 comprises a disc 4a fixed concentrically to the shaft connecting engine 2 to generator 3, and an electronic circuit 4b associated with a photo-electric or magnetic sensor, which is not shown separately, which produces signal SMV in response to the passing, in front of said sensor, of teeth or holes arranged regularly at the periphery of disc 4a which also have not been shown separately.

Measuring device 4 will not be described in more detail since it concerns a well known device which may also be realised in various other ways which are also well known.

Vehicle 1 also comprises an electric motor 5 whose rotor, which is not shown separately, is connected to a drive wheel 6 by a mechanical connection also represented by a double line.

Motor 5 and wheel 6 are also separate in FIG. 1, but it is evident that they may also be mounted close to each other. Likewise, the mechanical connection between the rotor of motor 5 and wheel 6 may be direct, as has been shown, or realised by way of a gear train or any other similar device.

Motor 5, which is the drive motor of vehicle 1, will not be described in detail since it may be of any one of the different types of electric motors which are suitable for this use and which are well known.

It will be admitted that, in the present example, motor 5 is an asynchronous motor.

Vehicle 1 also comprises another measuring device, designated by the reference 7, supplying a measurement signal SMW proportional to the rotation speed W of motor 5 which is evidently also, in the present example, the rotation speed of wheel 6.

Measuring device 7 comprises a disc 7a similar to disc 4a mentioned above and fixed concentrically to the shaft connecting motor 5 to wheel 6, as well as an electronic circuit 7b similar to circuit 4b also mentioned above which provides signal SMW. Measuring device 7 will not be described in more detail either for the same reasons as those which were given above in relation to measuring device 4.

Vehicle 1 also comprises a control device 8 upon which the driver of said vehicle 1 can act to regulate the speed of the latter.

In the present example, control device 8 comprises an accelerator pedal 8a mechanically coupled to a detector 8b providing a signal SCF representative of the position of this pedal 8a. In other embodiments of vehicle 1, accelerator pedal 8a may be replaced by any other suitable control member, for example by a lever able to be manually operated by the driver of the vehicle. An embodiment of this type has not been shown.

Detector 8b will not be described in detail since it is a device which may be realised in various ways well known to persons skilled in the art.

As in all vehicles whose drive motor is an electric motor, each position of accelerator pedal 8a corresponds to a desired power, which will be called FC in the description which follows, and whose value, which is proportional to the value of signal SCF, is that which the electric power supplied to motor 5 by its control circuit, which will be described below, must have in order for the speed of vehicle 1 to be maintained at the speed desired by the driver of this vehicle 1 or to reach the latter speed.

The electric power supplied to motor 5 by its control circuit will be designated by the reference F in the description which follows.

Signal SCF and desired power FC obviously have zero value when the driver of vehicle 1 is not touching accelerator pedal 8a, and a maximum value SCFmax and respectively, FCmax when this driver presses this pedal 8a against its end stop.

The proportionality ratio between signal SCF and desired power FC will be designated by the reference R in the description which follows.

Vehicle 1 also comprises a regulating circuit 9 which is intended in particular to slave electric power F supplied to motor 5 to the desired power FC determined by the position of accelerator pedal 8a.

Regulating circuit 9 is also intended to regulate rotation speed V of gasoline engine 2 to the value for which the latter supplies, when control signal SP of its carburettor 2a has above-defined value SPf, a mechanical power P equal to the sum of electric power F supplied to motor 5, losses DG in generator 3 and the losses in the control circuit of this motor 5. These latter losses will be designated by the reference DC in the description which follows.

In order to carry out these functions, in a manner which will be described below, regulating circuit 9 comprises in particular a slaving circuit 10 arranged between generator 3 and motor 5.

Slaving circuit 10 comprises, in the conventional manner, a control circuit 10a of motor 5, a circuit 10b for measuring electric power F supplied by this control circuit 10a to motor 5, and an integrating circuit 10c.

Control circuit 10a receives from generator 3 electric power E supplied by the latter, and it is arranged so as to supply to motor 5 a voltage and/or a current having a form suited to the nature of this motor 5, and to regulate electric power F supplied to the latter as a function of a control signal SF the production of which will be described below.

In the present example, where motor 5 is an asynchronous motor, control circuit 10a may, for example, be arranged so as to apply to this motor 5 an alternating voltage formed of pulses having a fixed amplitude but a frequency and a cyclical ratio that are variable as a function of signal SF. This technique of producing this voltage is often designated by the initials PWM of the name (Pulse Width Modulation) it is usually called by.

Measuring circuit 10b is arranged so as to supply a measurement signal SMF proportional to the electric power F supplied by control circuit 10a to motor 5.

Integrating circuit 10c is arranged so as to produce signal SF with a value equal to the integral as a function of the time of the difference between a desired power signal SCFa and measurement signal SMF mentioned above. The production of desired power signal SCFa will be described below. It will merely be mentioned here that this signal SCFa is proportional to a desired power FCa, which, as will also be seen below, may take different values, the proportionality ratio between signal SCFa and desired power FCa also having aforementioned value R.

The three circuits, 10a, 10b and 10c will not be described in more detail since they may be realised in various ways well known to persons skilled in the art.

It will merely be mentioned that they are of course suited to each other and that they are arranged so that, when measurement signal SMF is equal to desired power signal SCFa, control signal SF has a value such that electric power F supplied to motor 5 is equal to desired power FCa. If signal SCFa increases, for example, the difference between this signal SCFa and signal SMF becomes positive, and signal SF, which is equal to the integral as a function of the time of this difference, increases, so that electric power F also increases, as does signal SMF. When the latter becomes equal to signal SCFa, the difference between these two signals is reduced to zero and signal SF stops increasing. A similar process evidently takes place when the difference between signals SCFa and SMF becomes negative.

It will be also admitted that the power dissipated in measuring circuit 10b of electric power F is zero or at least negligible in relation to the latter.

For a reason which will be explained below, the components of control circuit 10a through which the current supplied to motor 5 flows, are so dimensioned that their nominal current, that is to say the maximum current which they can withstand permanently without damage, is equal to the current absorbed by this motor 5 when it rotates at its maximum speed while providing its maximum mechanical power.

This current absorbed by motor 5 in these conditions is evidently markedly lower than that which motor 5 can absorb when it rotates at low speed or when it is at rest.

It follows from this dimensioning of these components of control circuit 10a that the maximum electric power FM which this control circuit 10a can supply to motor 5 without damage is lower when the latter is at rest or rotating slowly than when it rotates at its maximum speed.

Figure 3:
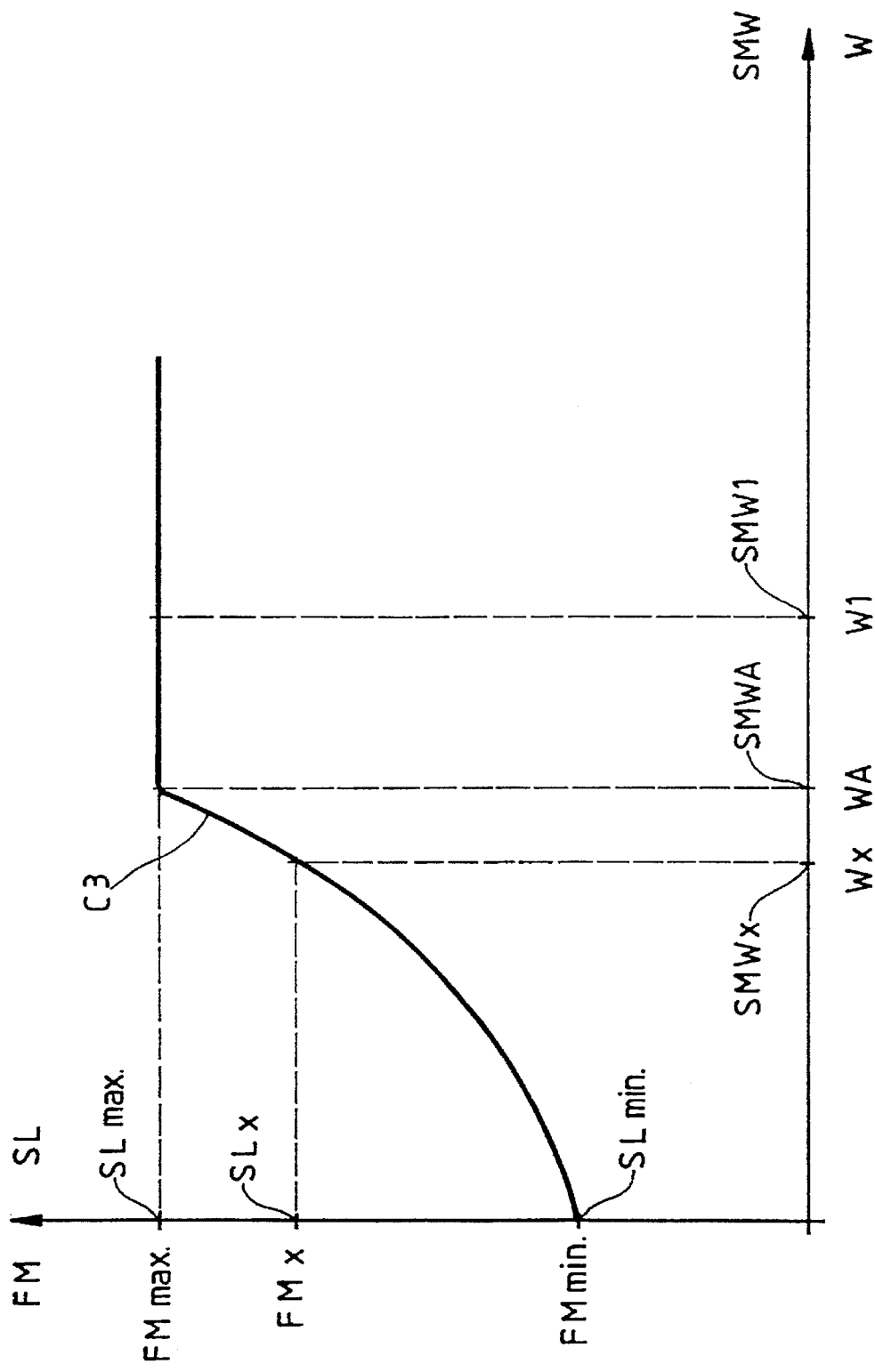
FIG. 3 is a diagram schematically representing the variation of the maximum electric power FM that a control circuit can safely supply to an electric motor as a function of the rotation speed W of the motor.

Curve C3 of FIG. 3 represents schematically the variation of this maximum electric power FM as a function of rotation speed W of motor 5, which is a characteristic of the assembly formed by control circuit 10b and by this motor 5.

This FIG. 3 shows that maximum electric power FM which control circuit 10a can supply without damage to motor 5 varies from a minimum value FMmin to a maximum value FMmax when rotation speed W of motor 5 varies from zero to a value WA and remains equal to this maximum value FMmax when this rotation speed W increases beyond this value WA.

It is to be noted here that when accelerator pedal 8a of vehicle 1 is pressed against its end stop, desired signal SCF produced by sensor 8b has its maximum value SCFmax which is proportional to maximum value FCmax of desired power FC. Further, the value of this desired power FC is that which electric power F supplied by control circuit 10a must have in order for vehicle 1 to move at the wanted speed or to reach the latter speed. It is thus clear that control circuit 10a must be so dimensioned that value FMmax of maximum power FM which it can supply without being damaged to motor 5 is at least equal to value FCmax of desired power FC. It will be admitted in the description which follows that control circuit 10a is so dimensioned that these values FMmax and FCmax are equal.

Regulating circuit 9 also comprises a first signal processing circuit, designated by the reference 11, whose input is connected to electronic circuit 7b of measuring device 7 of rotation speed W of drive motor 5 and thus receives measurement signal SMW proportional to this rotation speed W.

For a reason which will be explained below, signal processing circuit 11 is arranged so as to produce a limitation signal SL proportional to maximum electric power FM defined above.

Signal SL thus also passes from a value SLmin corresponding to FMmin, to a value SLmax, corresponding to FMmax, when the value of signal SMW passes from zero to value SMWA corresponding to rotation speed WA, and remains at this value SLmax when signal SMW increases beyond SMWA.

Curve C3 of FIG. 3 thus also shows the variation of signal SL as a function of signal SMW when the scales of the two axes of the diagram of said FIG. 3 are selected accordingly.

The man skilled in the art will easily recognize that processing circuit 11 may advantageously be formed by a Read Only Memory, which is a well known component and will therefore not be described in detail.

For a reason which will be made clear below, processing circuit 11 is arranged so that the proportionality ratio between signal SL and power FM also has aforementioned value R.

Regulating circuit 9 also comprises a multiplier circuit 12 having two inputs which receive respectively signal SCF and signal SL.

Again for a reasons which will be explained below, multiplier circuit 12 is arranged so that the value of signal SCFb which it provides at its output is always equal to the product of the value of signal SCF and the ratio between the value of signal SL and its maximum value SLmax.

In other words, multiplier circuit 12 is arranged so that the value of signal SCFb verifies the equation:

$$SCFb = SCF \frac{SL}{SLmax}$$

This equation shows that when motor 5 rotates at a speed W equal to or greater than speed WA and signal SL has thus it value SLmax, signal SCFb is equal to signal SCF. On the other hand, when rotation speed W of motor 5 is less than speed WA and signal SL has thus a value less than its value SLmax, signal SCFb is less than signal SCF.

It will be seen below that signal SCFb is a desired power signal proportional to a desired power FCb, the proportionality ratio between this signal SCFb and this desired power FCb also having above-defined value R.

Figure 4:
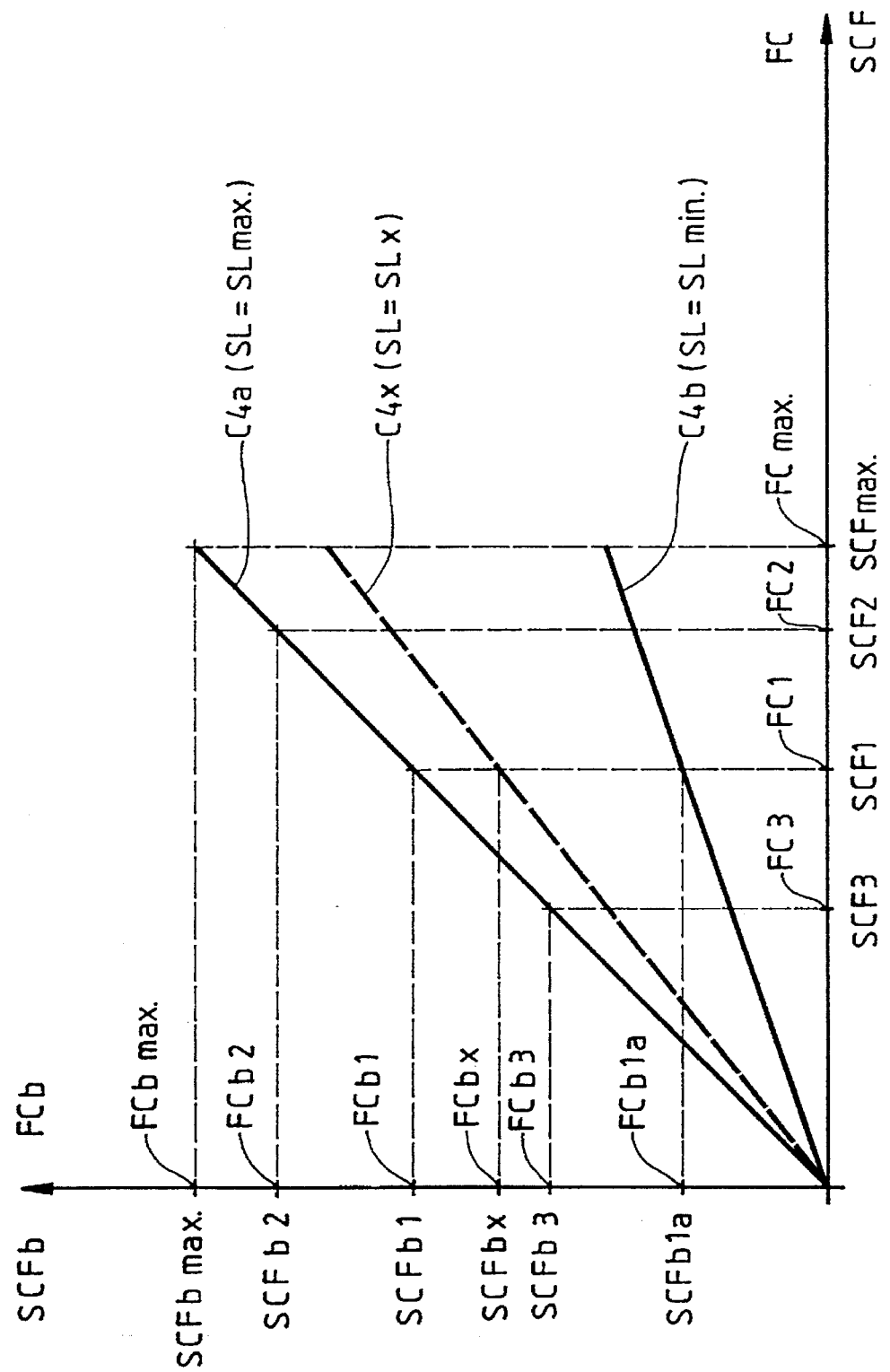
FIG. 4 is a diagram schematically representing the characteristics of a first signal processing circuit in the block diagram of FIG. 1.

The straight lines designated C4a and C4b in FIG. 4 represent respectively, by way of example, the variation of signal SCFb as a function of signal SCF and thus the variation of desired power FCb as a function of desired power FC for the two values SLmax and SLmin of signal SL.

Multiplier circuit 12 will not be described in more detail since it can be realised in various ways well known to the man skilled in the art.

Regulating circuit 9 comprises a second signal processing circuit, designated by the reference 13, which responds to desired power signal SCFb to produce a signal SCV which, as will be seen, is a desired speed signal proportional to a desired rotation speed VC of gasoline engine 2.

For a reason which will also be made clear below, processing circuit 13 is arranged so that, for each value of signal SCFb, and thus for each value of desired power FCb, signal SCV has a value equal to that which signal SMV has when control signal SP of carburettor 2a of engine 2 has its value SPf defined above and engine 2 rotates at speed V for which the mechanical power P it produces is equal to the sum of desired power FCb and powers DG and DC dissipated in generator 3 and in control circuit 10a.

In other words, desired speed VC proportional desired speed signal SCV is that at which engine 2 must rotate, when the throttle valve of its carburettor 2a is in the position corresponding to value SPf of signal SP, to provide a mechanical power P equal to the sum of desired power FCb proportional to signal SCFb and dissipated powers DG and DC defined above.

Figure 5:
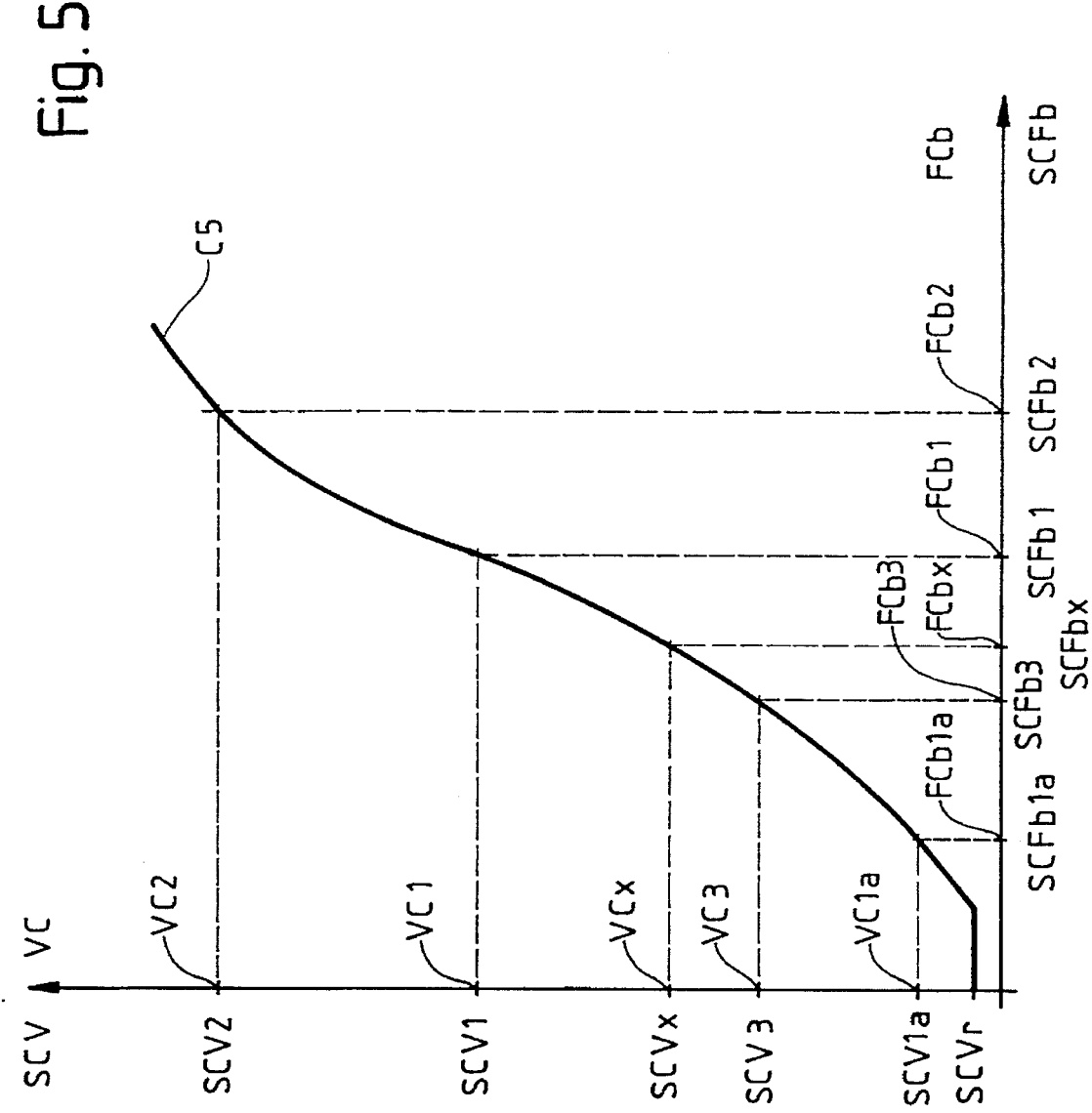
FIG. 5 is a diagram schematically representing the characteristics of a second signal processing circuit in the block diagram of FIG. 1.

Curve C5 of FIG. 5 represents the characteristic of processing circuit 13, that is to say the variation of signal SCV as a function of signal SCFb and thus, if the scales of the two axes of this FIG. 5 are selected appropriately, the variation of desired speed VC as a function of desired power FCb.

The man skilled in the art will easily be able to recognise that processing circuit 13 may also be advantageously formed by a Read Only Memory.

Signal SCV produced by processing circuit 13 is applied to a first input of a comparator circuit 14 which comprises a second input to which signal SMV proportional to rotation speed V of engine 2 is applied.

Comparator 14 has an output which produces control signal SP of carburettor 2a of engine 2, and it is arranged so that this signal SP selectively takes its values SPmax, SPF and SPmin according to whether signal SCV is respectively greater than, equal to or less than signal SMV.

As will be shown in more detail herein below, comparator 14 and carburettor 2a together constitute a slaving circuit for slaving rotation speed V of engine 2 to desired speed VC proportional to signal SCV. Further, this comparator 14, this carburettor 2a and processing circuit 13 together constitute a slaving circuit for slaving mechanical power P supplied by engine 2 to the sum of desired power FCb proportional to signal SCFb and above-defined dissipated powers DG and DC.

Signal SMV proportional to rotation speed V of engine 2 is also applied to the input of a third signal processing circuit which is designated by the reference 15.

For a reason which will be made clear below, signal processing circuit 15 is arranged so that, for each value of signal SMV, signal SCFc which it produces at its output is proportional to a desired power FCc which is equal to the difference between, on the one hand, mechanical power P supplied by engine 2 when it rotates at speed V corresponding to this value of signal SMV and when signal SP has its value SPf and, on the other hand, the sum of dissipated powers DG and DC. Processing circuit 15 is also arranged so that the proportionality ratio between signal SCFc and desired power FCc also has above defined value R.

Figure 6:
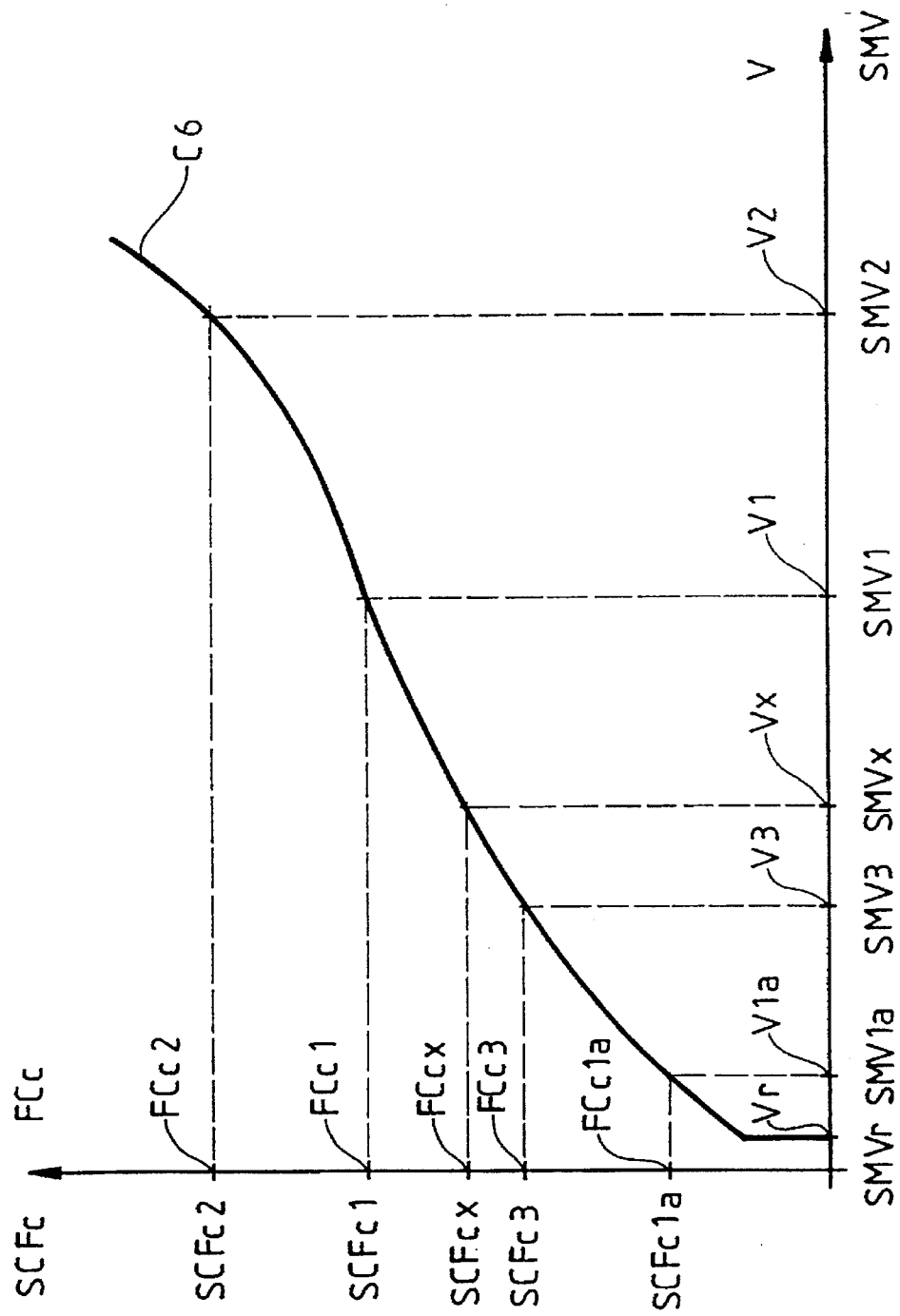
FIG. 6 is a diagram schematically representing the characteristics of a third signal processing circuit in the block diagram of FIG. 1.

Curve C6 of FIG. 6 represents schematically the characteristic of processing circuit 15, that is to say, the variation of signal SCFc as a function of signal SMV, and thus the variation of desired power FCc as a function of rotation speed V of engine 2. It can be seen that this curve C6 has the same trend as curve C2b of FIG. 2 and, in particular, that signal SCFc and thus desired power FCc are zero when signal SMV has its value SMVr corresponding to idling speed Vr of engine 2.

The man skilled in the art will easily see that processing circuit 15 may also be advantageously formed by a Read Only Memory.

Signal SCFc is applied to a first input of a comparator circuit, designated by the reference 16, which comprises a second input receiving signal SCFb supplied by multiplier circuit 12. Comparator 16 is arranged so as to produce at its output a switching signal SD which selectively takes a first state SD1 or a second state SD2 according to whether signal SCFb is greater or less than signal SCFc.

As will be made clear below, comparator 16 may equally be arranged so that signal SD is either in its first state SD1 or in its second state SD2 when signals SCFb and SCFc are equal.

This comparator circuit 16 will not be described in detail since the man skilled in the art will be able to realise it without difficulty in one or other of the various well known ways.

Regulating circuit 9 further comprises a switching circuit, designated by the reference 17, having two signal inputs receiving respectively signal SCFb and signal SCFc, a control input receiving signal SD produced by comparator 16 and an output providing desired power signal SCFa applied to integrator circuit 10c which is mentioned above. This switching circuit 17 is arranged so that signal SCFa is selectively equal to signal SCFb or to signal SCFc according to whether signal SD is in its first state SD1 or, respectively in its second state SD 2.

One can see that, as a result of the arrangement of circuits 16 and 17, signal SCFa is always equal to the smallest of signals SCFb and SCFc, or to both of these signals if they are equal.

Circuits 16 and 17 will not be described in detail since they may both be realised in various ways which are well known to persons skilled in the art.

To begin the description of the operation of vehicle 1, and more particularly the operation of regulating circuit 9, it will be admitted that the driver of this vehicle 1 has, for a certain period of time, maintained accelerator pedal 8a in a position where signal SCF produced by detector 8b has a value SCF1 which is not zero and is less than its maximum value SCFmax, and which is proportional to a value FC1 of desired power FC.

It will also be admitted that vehicle 1 has been moving, again for a certain period of time, over perfectly flat ground and at a constant speed such that motor 5 is rotating at a speed W1 which is greater than aforementioned speed WA.

Limitation signal SL therefore has its maximum value SLmax (see FIG. 3). The characteristic of multiplier circuit 12 is thus that which is represented by straight line C4a of FIG. 4, and signal SCFb produced by multiplier circuit 12 has a value SCFb1 equal to value SCF1 of signal SCF.

Desired power FCb thus has a value FCb1 equal to value FC1 of desired power FC.

As signal SCFb has this value SCFb1, signal SCV produced by processing circuit 13 has a value SCV1 (FIG. 5).

It will further be admitted that signal SCV has had this value SCV1 for a sufficient period of time for rotation speed V of engine 2 to have stabilised at value V1 equal to desired value VC1 proportional to this value SCV1 of signal SCV.

Rotation speed measurement signal SMV of engine 2 thus has a value SMV1 equal to value SCV1 of signal SCV, and signal SP supplied by comparator 14 has its value SPf.

Value P1 of mechanical power P supplied by engine 2 is thus represented by the ordinate of the point of curve C2b of FIG. 2 whose abscissa represents the value V1 of the rotation speed of engine 2.

It follows from the characteristic of signal processing circuit 13 which is defined above and represented by FIG. 5, that this power P1 is equal to the sum of aforementioned desired power FCb1, which, it will be recalled, is equal in the present case to desired power FC1, and powers DC and DG dissipated in generator 3 and in control circuit 10a of motor 5.

Electric power E supplied by generator 3 evidently has a value E1 equal to the difference between power P1 and dissipated power DG, and thus also equal to the sum of desired power FC1 and power DC which is dissipated in control circuit 10a.

As measurement signal SMV of rotation speed V of engine 2 has above-defined value SMV1, signal SCFc produced by signal processing circuit 15 has a value SCFc1, and desired power FCc has a value FCc1 proportional to this value SCFc1 of this signal SCFc.

It follows from the characteristic of signal processing circuit 15 which is defined above and represented in FIG. 6, that this desired power FCc1 is equal to the difference between, on the one hand, power P1 supplied by engine 2 and, on the other hand, the sum of powers DG and DC dissipated in generator 3 and in control circuit 10a of motor 5.

It can be seen that this desired power FCc1 is equal to desired power FCb1, and that the same is therefore true of values SCFc1 and SCFb1 of signals SCFc and SCFb respectively.

Desired power signal SCFa provided by switch 17 thus has a value SCFa1 equal to this value SCFb1 which, as has been seen above, is itself equal to value SCF1 of signal SCF produced by detector 8b of the position of accelerator pedal 8a.

If this situation has lasted for a sufficiently long time, electric power F supplied by control circuit 10a to motor 5 has a value F1 which is proportional to value SCFa1 of signal SCFa, and it is thus equal to desired power FC1 proportional to value SCF1 of signal SCF. This electric power F1 therefore corresponds to the position of accelerator pedal 8a.

In order for this electric power F to have this value F1, electric power E supplied by generator 3 to control circuit 10a must of course have a value equal to the sum of this value F1 and power DC dissipated in this control circuit 10a.

This is indeed the case, since one has seen above that this electric power E has a value E1 equal to the sum of desired power FC1 and power DC dissipated in control circuit 10a, and that the power F1 is equal to this desired power FC1.

This situation, which may be designated as being a situation of equilibrium, is maintained as long as the driver of vehicle 1 does not change the position of accelerator pedal 8a and the slope of the ground over which this vehicle 1 travels does not change.

When vehicle 1 is in the situation which has just been described, and its driver wishes to increase its speed or to keep this speed constant, despite an increase of the slope of the ground over which vehicle 1 is travelling, he moves accelerator pedal 8a towards its end stop position until it reaches a position where signal SCF takes, for example, a value SCF2 greater than preceding value SCF1 and proportional to a new desired power SCF2 also greater than preceding desired power SCF1.

Since rotation speed W of motor 5 is still greater than speed WA, signal SL still has its value SLmax, and signal SCFb produced by multiplier circuit 12 takes a value SCFb2 equal to value SCF2 of signal SCF (FIG. 4).

In response to this value SCFb2 of signal SCFb, signal SCV produced by processing circuit 13 takes a new value SCV2 greater than preceding value SCV1 (FIG. 5).

Since rotation speed V of engine 2 can evidently not instantaneously increase to value V2 equal to desired speed VC2 proportional to this new value SCV2 of signal SCV, the latter value SCV2 is evidently greater, at least initially, than measurement signal value SMV1 of rotation speed V of this engine 2.

Signal SP provided by comparator 14 thus takes its maximum value SPmax, and the throttle valve of carburettor 2a of engine 2 opens completely.

Mechanical power P provided by engine 2 thus increases to a value P1' (FIG. 2).

As will be seen herein below, this increase in power P has the effect of increasing rotation speed V of engine 2 to a speed V2 equal to desired speed VC2.

However, so long as this rotation speed V has not reached this value V2, measurement signal SMV of this speed V remains less than new value SCV2 of signal SCV, and desired power signal SCFc produced by processing circuit 15 remains less than new value SCFb2 of signal SCFb.

Comparator 16 thus gives signal SD its second state SD2, so that signal SCFa provided by switch 17 is equal to signal SCFc, and desired power FCa to which slaving circuit 10 slaves electric power F supplied to motor 5 is equal to desired power FCc proportional to this signal SCFc.

One will recall that signal processing circuit 15 is arranged so that this desired power FCc is always equal to the difference between fraction f of maximum mechanical power Pmax which engine 2 can provide at the speed at which it rotates and the sum of dissipated powers DG and DC.

Since signal SP has taken its value SPmax and mechanical power P has taken its value P1' as has been shown above, electric power F supplied by control circuit 10a to motor 5, which is slaved to desired power FCc since the value of signal SCFa is equal to the value of signal SCFc, is thus less than the difference between this mechanical power P1' and the sum of dissipated powers DG and DC.

This mechanical power P1' is thus greater than that which generator 3 absorbs, and rotation speed V of engine 2 increases until signal SMV reaches value SMV2 equal to value SCV2 of signal SCV.

When this signal SMV reaches this value SMV2, comparator circuit 14 restores to signal SP its value SPf, and power P, which had increased from its value P1' to its value P2', decreases to its value P2 (FIG. 2).

During the acceleration of engine 2, desired power signal SCFc evidently increases at the same time as signal SMV and passes from its value SCFc1 to its value SCFc2. But as long as it has not yet reached this value SCFc2, it remains less than signal SCFb, so that signal SCFa is still equal to this signal SCFc.

It follows from this that desired power FCa, to which circuit 10 slaves electric power F supplied by control circuit 10a of motor 5, increases at the same time as rotation speed V of engine 2 and always remains equal to the difference between mechanical power P which engine 2 would supply if signal SP had its value SPf and the sum of dissipated powers DG and DC. Further, this desired power FCa remains less than desired power FCb2 proportional to value SCFb2 of signal SCFb.

It is only at the moment when rotation speed V of engine 2 reaches its value V2 and mechanical power P supplied by the latter decreases to value P2 as mentioned above, that desired power FCc, and thus desired power FCa, reach value FCb2 of desired power FCb.

After this moment, and so long as the position of accelerator pedal 8a is not modified and the slope of the ground over which vehicle 1 travels does not change, the situation which has just been described remains stable.

If the driver of vehicle 1 wishes to reduce the speed of the latter or to keep it constant despite a decrease in the slope of the ground over which vehicle 1 travels, he moves accelerator pedal 8a towards its rest position until it reaches a position where signal SCF takes, for example, a value SCF3 which is less than preceding value SCF2 and proportional to a new desired power FC3 which is also less than preceding desired power FC2.

Since rotation speed W of motor 5 is evidently still greater than speed WA, signal SL still has its value SLmax, and signal SCFb takes a value SCFb3 equal to value SCF3 of signal SCF (FIG. 4).

In response to this value SCFb3 signal of signal SCFb, signal SCV takes a new value SCV3 which is less than preceding value SCV2 (FIG. 5).

Since rotation speed V of engine 2 can evidently not instantaneously decrease to value V3 equal to desired speed VC3 proportional to this new value SCV3 of signal SCV, this latter value SCV3 is evidently less than measurement signal value SMV2 of rotation speed V of this engine 2, at least initially.

Signal SP provided by comparator 14 thus takes its minimum value SPmin, and the throttle valve of engine carburettor 2a closes completely.

Mechanical power P supplied by engine 2 thus becomes practically zero and the rotation speed of this engine 2 decreases until it reaches value V3 equal to new desired value VC3.

However, as long as this rotation speed V has not reached this value V3, measurement signal SMV of this speed V remains greater than new value SCV3 of signal SCV and desired power signal SCFc produced by processing circuit 15 remains greater than new value SCFb3 of signal SCFb.

Comparator 16 thus gives signal SD its first state SD1, so that signal SCFa provided by switch 17 immediately takes a value SCFa3 equal to value SCFb3 of signal SCFb.

Desired power FCa to which slaving circuit 10 slaves electric power F supplied by control circuit 10a to motor 5 thus takes, also immediately, value FCa3 equal to value FCb3 of desired power FCb, which, as has been seen above, is equal to new value FC3 of desired power FC.

When rotation speed V of engine 2 reaches value V3 and signal SMV thus reaches its value SMV3 equal to value SCV3 of desired speed signal SCV, comparator circuit 14 restores to signal SP its value SPf and mechanical power P supplied by engine 2 takes value P3. It can easily be seen that this value P3 of mechanical power P is that which is equal to the sum of desired power FCa3, which is itself equal to desired power FC3, and dissipated powers DG and DC in generator 3 and control circuit 10a.

This situation also remains stable as long as the position of accelerator pedal 8a is not modified and/or the slope of the ground over which vehicle 1 travels does not change.

Let us now consider the case where vehicle 1 is at rest and where accelerator pedal 8a has been in its rest position for a certain period of time.

Signal SCFb is thus zero and signal SCV has, consequently, its value SCVr (FIG. 5). Engine 2 rotates at its idling speed Vr, so that signal SMV has its value SMVr equal to value SCVr. Signal SCFc is thus zero (FIG. 6) as is signal SCFa, and control circuit 10a does not supply any electric F power to motor 5.

On the other hand, measurement signal SMW of rotation speed W of motor 5 is zero, and limitation signal SL has thus its minimum value SLmin (FIG. 3).

If the driver of vehicle 1 then presses on accelerator pedal 8a, with the intention of making this vehicle 1 move off, signal SCF takes a value corresponding to the new position of this pedal 8a. It will be admitted that this signal SCF takes value SCF1 which has already been used above. (This value SCF1 has been arbitrarily chosen, with the aim of not overloading the drawing unnecessarily).

Since signal SL has its value SLmin, the value of signal SCFb is represented by the ordinate of the point of straight line C4b of FIG. 4 whose abscissa is represented by value SCF1 of signal SCF. This value of signal SCFb has been designated as SCFb1a.

In response to this value SCFb1a of signal SCFb, processing circuit 13 gives signal SCV a value SCV1a, which is evidently greater than value SCVr.

Engine 2 is still idly rotating and since signal SMV still has its value SMVr, comparator 14 gives signal SP its value SPmax, and mechanical power P supplied by engine 2 takes value Pr' represented by the ordinate of the point of curve C2a whose abscissa represents rotation speed Vr. Since this power Pr' is greater than that which is absorbed by generator 3, rotation speed V of engine 2 begins to increase and tends towards speed V1a proportional to value SCV1a of signal SCV. At the same time, mechanical power P increases and tends towards value P1a represented by the ordinate of the point of curve C2a whose abscissa represents speed V1a.

Signal SCFc thus also begins to increase, but evidently remains, at least initially, less than value SCFb1a of signal SCFb.

Signal SCFa thus has the same value as signal SCFc and evidently increases at the same time as the latter. Electric power F supplied by control circuit 10a to motor 5 thus also increases, and as soon as it reaches a sufficient value, vehicle 1 begins to move.

Rotation speed W of motor 5 thus begins to increase, as evidently does the value of signal SMW. Signal SL thus increases, so that signal SCFb also increases, as does signal SCV.

Signal SMV remains, at least at the beginning of this process, less than signal SCV, so that signal SP keeps its value SPmax and mechanical power P supplied by engine 2 keeps its value Pmax, which evidently increases at the same time as rotation speed V of this engine 2 (curve C2a of FIG. 2).

This increase in rotation speed V of engine 2 drives a corresponding increase in signal SMV and thus in signal SCFc.

As long as signal SMV remains less than signal SCV, signal SP keeps its value SPmax, and mechanical power P supplied by engine 2 is still equal to maximum mechanical power Pmax which this engine 2 can provide at speed V at which it rotates.

Further, signal SCFa remains equal to signal SCFc and electric power F provided by control circuit 10a to motor 5 is thus still proportional to this signal SCFc and increases like the latter.

Mechanical power P is thus still greater than the sum of this electric power F and dissipated powers DG and DC, so that rotation speed V of engine 2 continues to increase.

This process continues until signal SMV becomes equal to signal SCV and comparator 14 restores to signal SP its value SPf. From this moment onwards, signal SCFc and signal SCFa are equal to signal SCFb.

If, during the course of this process, the speed of vehicle 1 has reacheed a greater value than that for which rotation speed W of motor 5 is equal to speed WA, signal SL has taken its value SLmax, and signal SCFb has value SCFb1 equal to value SCF1 of signal SCF, and signal SCFa of course also has this value SCF1.

Vehicle 1 is thus in a similar situation to that which has been described above.

If, on the other hand, when signal SMV becomes equal to signal SCV, the speed of vehicle 1 is such that rotation speed W of motor 5 has a value less than speed WA, for example the value Wx indicated in FIG. 3, corresponding value SLx of signal SL is still less than its maximum value SLmax.

The characteristic of multiplier circuit 12 is thus represented, in this case, by straight line C4x of FIG. 4, and value SCFbx of signal SCFb is given by the ordinate of the point of this straight line C4x whose abscissa represents value SCF1 of signal SCF.

Signal SCV thus has corresponding value SCVx (FIG. 5) and signal SMV has value SMVx equal to this value SCVx.

Engine 2 thus provides mechanical power Px indicated in FIG. 2, and signal SCFc has value SCFcx equal to value SCFbx of signal SCFb. Signal SCFa thus has a value SCFax equal to this latter value SCFbx, and electric power F supplied by control circuit 10a to engine 2 has a value Fx proportional to this value SCFbx.

As emerges clearly from the description of the various operating modes of vehicle 1 which has just been made, the effect of the presence of circuits 13 to 17 in regulating circuit 9 is that electric power F supplied by control circuit 10a to electric drive motor 5 increases immediately when the driver of this vehicle 1 presses on accelerator pedal 8a, at the same time as rotation speed V of engine 2, contrary to what occurs in known vehicles of the same type. Further, this increase in this electric power F is gradual, since it depends directly upon the increase in mechanical power P which takes place as gasoline engine 2 accelerates. It follows from this that the behaviour of a vehicle according to the instant invention is very close to that of conventional vehicles whose drive motor is a gasoline engine, and that the danger which, in known vehicles of the same type, can arise from the delay which separates the moment when their driver presses on their accelerator pedal from the moment when the electric power supplied to their drive motor increases, is removed.

Finally, one can see that in a vehicle according to the instant invention, electric power F supplied by control circuit 10a to drive motor 5 never exceeds maximum value FM which is defined above, and that this is due to the presence in this vehicle 1 of measurement device 7 of rotation speed W of motor 5, signal processing circuit 11 and multiplier circuit 12.

It follows that the components of control circuit 10a which are traversed by the current absorbed by drive motor 5 may have a smaller nominal current, and thus be less voluminous and have a lower price, all other things being equal, than the corresponding components of known vehicles.

It should be noted that the different proportionality ratios mentioned in the description which has just been made, have been defined as all being equal merely for the purpose of simplifying this description. It is possible to give these proportionality ratios different values, the different components of the block diagram of FIG. 1 being in that case arranged accordingly.

Numerous modifications may be made to the vehicle described above and represented by FIG. 1 without departing from the scope of the instant invention.

Thus for example, it is possible to arrange comparator circuit 14 in such a way that control signal SP of carburettor 2a of engine 2 does not change abruptly as has been described above, but, on the contrary, changes gradually, between its values SPmax, SPf and SPmin.

The man skilled in the art will see that it may be advantageous to make this signal SP change gradually, in particular when it has to pass from its values SPmax or SPmin to its value SPf, in order to avoid oscillation of rotation speed V of engine 2 around the value for which signal SMV is equal to desired signal SCV.

Also by way of example, it is possible to insert a time-delay circuit between the output of signal processing circuit 15 and the input of switch 17 which receives signal SCFc in the block diagram of FIG. 1 to delay the increase of the signal applied to this input, and thus the increase of desired power signal SCFa, while rotation speed V of engine 2 increases.

As a result of the delay introduced by this time-delay circuit, the portion of mechanical power P supplied by engine 2 which is available for the acceleration of the latter increases, so that this acceleration is more significant than in the case represented in FIG. 1 and so that this engine 2 reaches its new rotation speed more rapidly.

It should also be noted that the instant invention is not limited to the above-described case of a vehicle having only one drive wheel, but that it evidently also applies to the case of vehicles having several drive wheels driven by a common drive motor, as well as to the case of vehicles having several drive motors each driving one or more drive wheels.

What is claimed is:

1. A motor vehicle comprising:
   a first engine constituted by an internal combustion engine for producing a mechanical power as a function of a rotation speed of said first engine;
   speed slaving means comprising first measurement means coupled to said first engine for providing a first measurement signal representative of the rotation speed of said first engine and responding to a desired speed signal representative of a desired rotation speed for slaving the rotation speed of said first engine to said desired rotation speed;
   a control device comprising a control member able to be actuated by a driver of said vehicle and a detector coupled to said control member for providing a first desired power signal representative of a position of said control member and of a first desired power;
   a generator mechanically coupled to said first engine for producing a first electrical power in response to said mechanical power;
   a drive wheel;
   a second engine constituted by an electric motor mechanically coupled to said drive wheel;
   regulating means responsive to said first electric power for supplying a second electric power to said second engine and responding to said first desired power signal for producing said desired speed signal and for slaving said second electric power to said first desired power; and
   second measurement means coupled to said second engine for supplying a second measurement signal representative of a rotation speed of said second engine;
   said regulating means comprising:
   power slaving means responsive to a second desired power signal representative of a second desired power for slaving said second electric power to said second desired power;
   safety means responsive to said first desired power signal and to said second measurement signal for providing a third desired power signal representative of a third desired power and arranged so that said third desired power signal has a value such that said third desired power is at most equal to a maximum electric power;
   first signal processing means responsive to said third desired power signal for providing said desired speed signal and arranged so that said desired speed signal has a value such that, when the rotation speed of said first engine is equal to said desired speed, a determined fraction of a maximum mechanical power, as a function of the rotation speed of said first engine, is equal to a sum of said third desired power, of a power dissipated in said generator and of a power dissipated in said power control means;
   second signal processing means responsive to said first measurement signal for providing a fourth desired power signal representative of a fourth desired power and arranged so that said fourth desired power signal has a value such that said fourth desired power is equal to a difference between said determined fraction of said maximum mechanical power and said dissipated powers; and
   selection means responsive to said third desired power signal and to said fourth desired power signal for providing said second desired power signal and arranged so that said second desired power signal has a value such that said second desired power is equal to said third desired power when said third desired power is lower than said fourth desired power and is equal to said fourth desired power when said fourth desired power is lower than said third desired power.

2. A motor vehicle according to claim 1, wherein said safety means comprises third signal processing means responding to said second measurement signal for providing a limitation signal representative of said maximum electric power and calculating means responding to said first desired power signal and to said limitation signal for producing said third desired power signal.

3. A motor vehicle according to claim 1, wherein said power slaving means comprises:
   means for controlling said mechanical power responding to a power control signal and arranged so that said mechanical power is equal to said maximum mechanical power, equal to said determined fraction of said maximum mechanical power or substantially zero, according to whether said power control signal has respectively a first value, a second value or a third value; and
   comparator means responding to said desired speed signal and to said first measurement signal for producing said power control signal and arranged so that said power control signal has said first value, said second value or said third value, according to whether said desired speed signal is respectively greater than, equal to or less than said first measurement signal.

4. A motor vehicle according to claim 1, wherein said selection means comprises:
   comparator means responding to said third desired power signal and to said fourth desired power signal for providing a switching signal and arranged so that said switching signal has a first state and a second state according to whether said third desired power signal is respectively less or greater than said fourth desired power signal; and switch means responding to said switching signal, to said third desired power signal and to said fourth desired power signal for providing said second desired power signal and arranged so that said second desired power signal has a value such that said second desired power is equal to said third desired power or to said fourth desired power according to whether said switching signal is respectively in its first state or in its second state.

5. A motor vehicle according to claim 1, wherein said determined fraction is substantially equal to 80%.

* * * * *